United States Patent [19]

Snow

[11] Patent Number: 4,991,434
[45] Date of Patent: Feb. 12, 1991

[54] METHOD AND APPARATUS FOR DETERMINING WHETHER A LIQUID IN A RESERVOIR IS ABOVE A CERTAIN LEVEL

[75] Inventor: A. Ray Snow, Sandy, Utah

[73] Assignee: Chain Tool Company, Inc., North Salt Lake, Utah

[21] Appl. No.: 375,526

[22] Filed: Jul. 5, 1989

[51] Int. Cl.⁵ .................... G01F 23/00; G01L 7/16
[52] U.S. Cl. ............................ 73/303; 33/717; 33/722; 73/864.62
[58] Field of Search .......... 73/290 R, 864.14, 864.16, 73/864.63, 864.62, 303; 33/717, 718, 719, 722, 727; 116/227

[56] References Cited

U.S. PATENT DOCUMENTS

| | | | |
|---|---|---|---|
| 1,108,561 | 8/1914 | Erickson | 73/864.62 |
| 1,963,080 | 6/1934 | Featherstone | 33/717 X |
| 2,043,877 | 6/1936 | Ashworth | 116/227 |
| 2,363,424 | 11/1944 | Keenan | 33/717 X |
| 2,660,058 | 11/1953 | Vogt | 33/717 X |
| 2,755,629 | 7/1956 | Baisch | 116/227 X |
| 3,055,764 | 9/1962 | Pryor et al. | 73/864.63 X |
| 3,521,366 | 7/1970 | Sampson et al. | 33/717 |
| 3,972,234 | 8/1976 | Osojnak | 116/227 |
| 4,403,519 | 9/1983 | Welker | 73/764.62 |
| 4,649,746 | 3/1987 | Snow | 73/290 R |
| 4,763,535 | 8/1988 | Rainin et al. | 73/864.16 X |
| 4,831,877 | 5/1989 | Snow | 73/290 R |

Primary Examiner—Daniel M. Yasich
Attorney, Agent, or Firm—Mallinckrodt & Mallinckrodt

[57] ABSTRACT

Apparatus for determining whether a liquid in a liquid reservoir is above a certain level includes suction means operable by a user to create suction when the user desires to determine if the liquid in the reservoir is above the certain level, a conduit extending from the suction means and adapted to be positioned in the reservoir so that a passage in the conduit which communicates with the suction created by the suction means opens into the reservoir above the liquid therein when the liquid is below the certain level, and indicator for indicating whether or not the passage in the conduit is opening into the reservoir above the liquid therein. The indication that the liquid is above the certain level is given by either observing that liquid is being drawn into the passage or that the passage opening is closed. This may be done by observing the liquid itself in the passage or an indicating reservoir, or observing the operation of the suction means which given an indication of flow into the passage. The apparatus may be used to replace the normal dipstick used to measure liquid levels, such as oil level in an automobile engine.

20 Claims, 3 Drawing Sheets

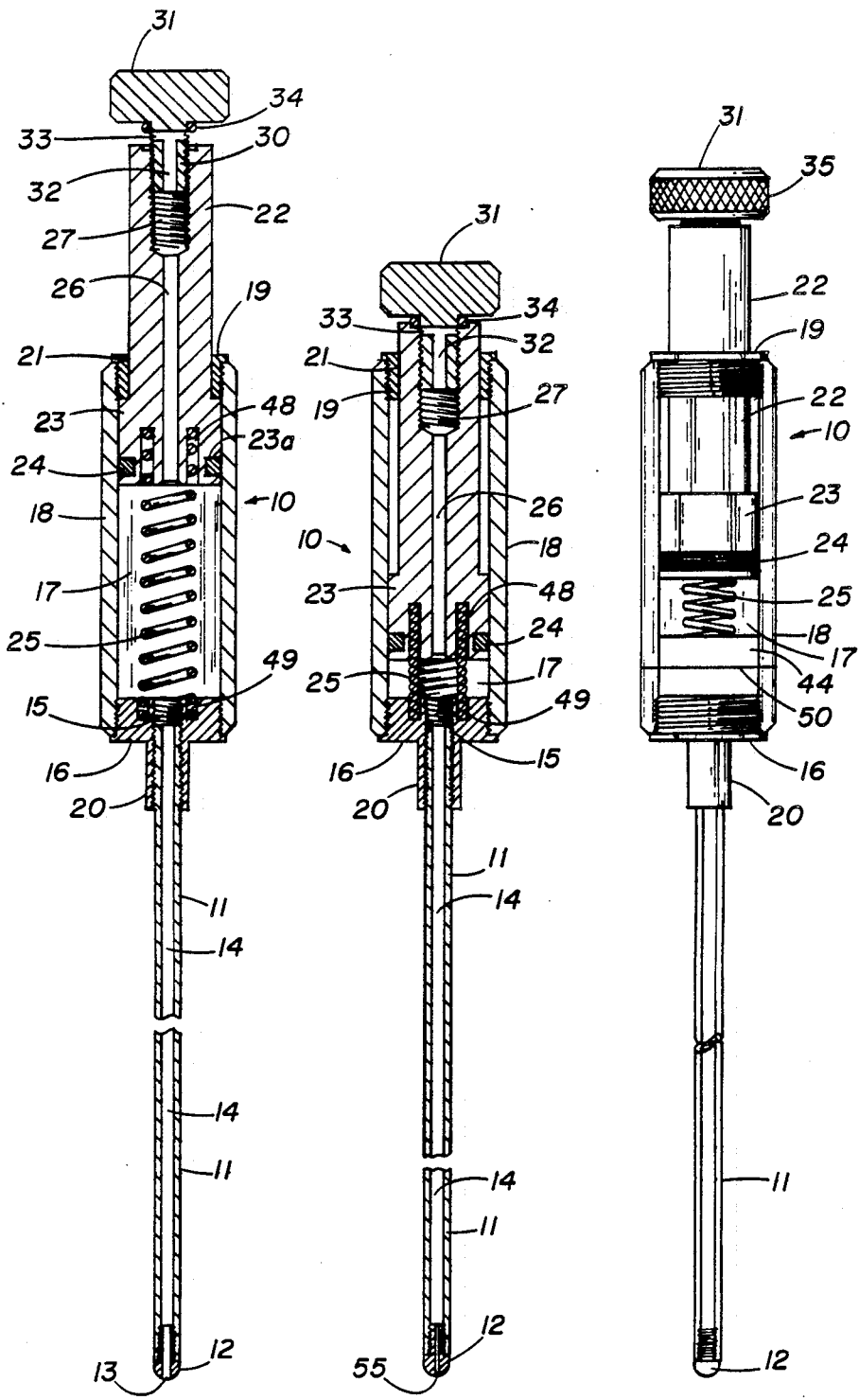

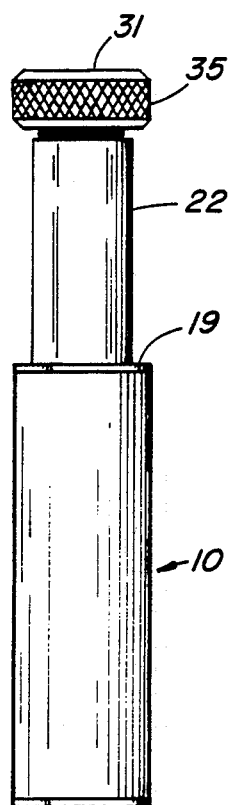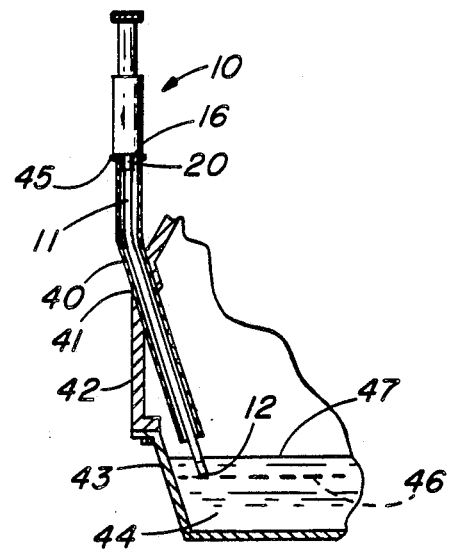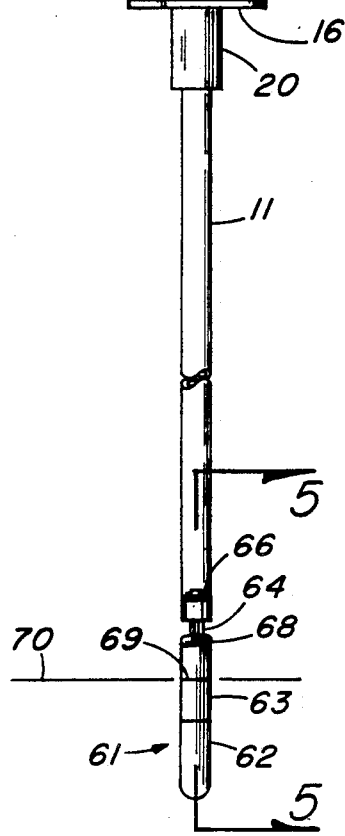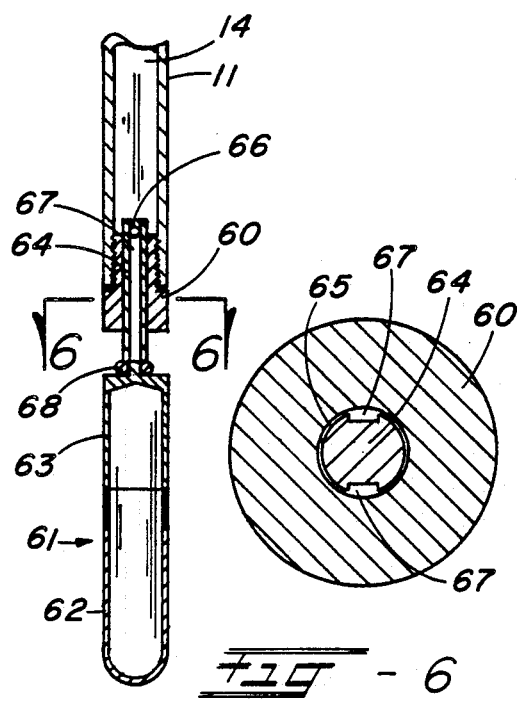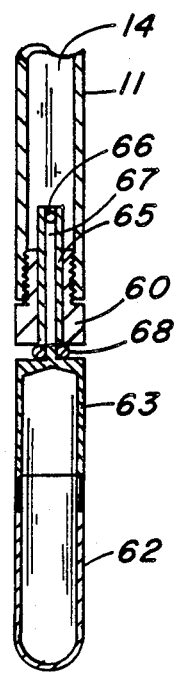

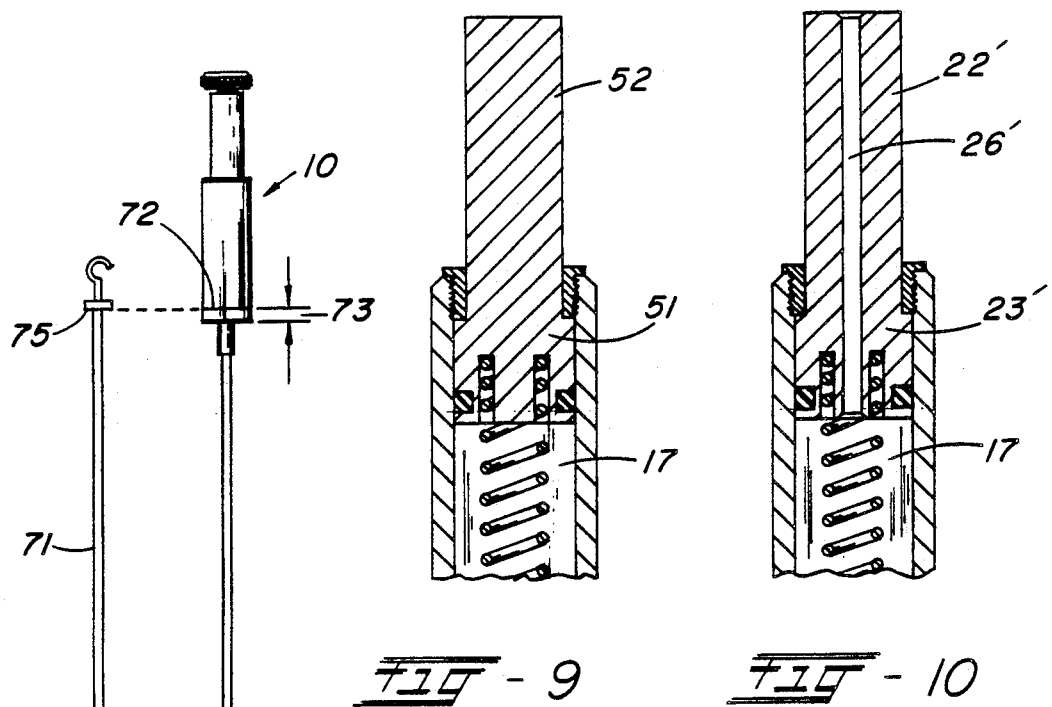
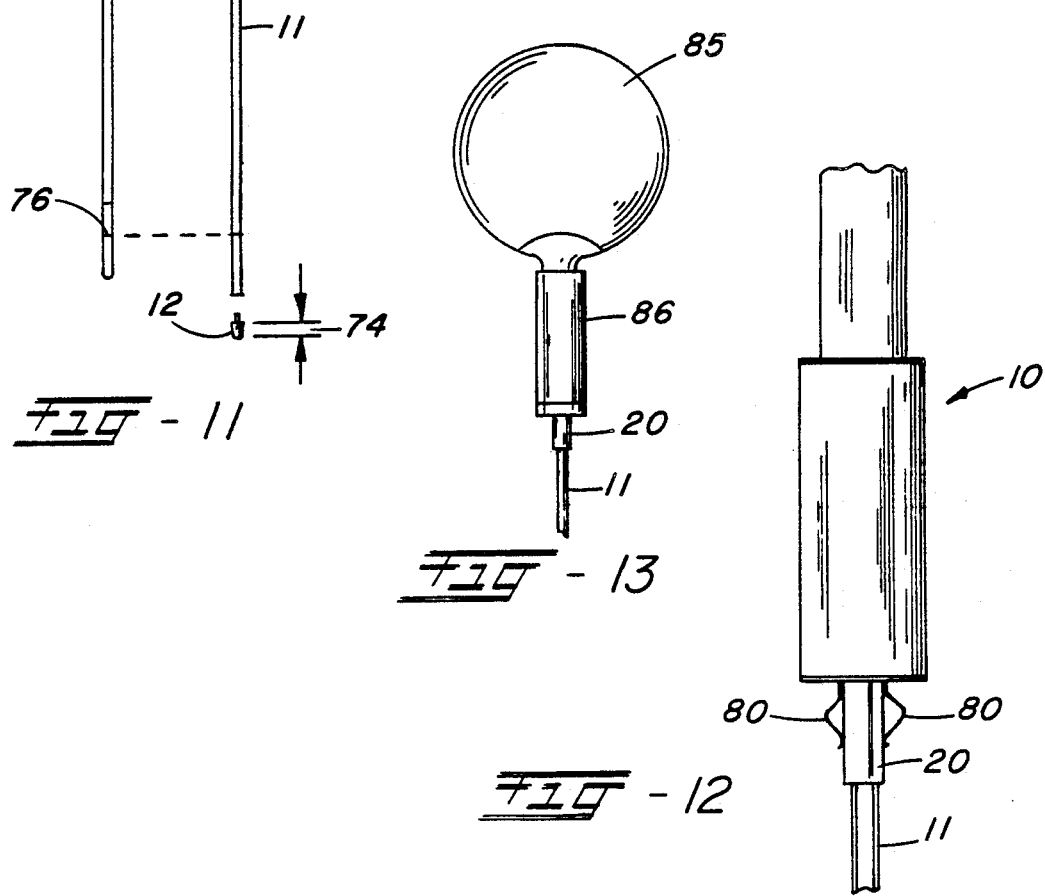

METHOD AND APPARATUS FOR DETERMINING WHETHER A LIQUID IN A RESERVOIR IS ABOVE A CERTAIN LEVEL

BACKGROUND OF THE INVENTION

1. Field

The invention is in the field of devices for measuring the liquid level in a liquid reservoir such as measuring the level of oil in the crankcase of an engine or the level of transmission fluid in a transmission to determine if such level is above a predetermined level.

2. State of the Art

There are many situations where it is desireable to measure the level of a liquid in a reservoir but where an absolute measurement is not required, only a determination as to whether the level of liquid in the reservoir is above a predetermined minimum level. Thus, in an automobile crankcase, it is not usually important to know the exact level of the oil in the crankcase, but only if the oil is above the level where it is necessary to add a quart of oil. The same is true of the level of transmission fluid in an automobile transmission and of most other automobile fluid levels.

U.S. Pat. Nos. 4,649,746 and 4,831,877 show devices which measure fluid level in a reservoir and when used to measure oil or transmission fluid level in an automobile, take the place of the normal dipstick. The advantage of the devices of the cited patents are that the oil level can be determined by merely depressing an easily accessible plunger and it is not necessary to actually grasp the dipstick, remove it, wipe it clean of fluid, replace it, remove it again and attempt to read the fluid level on the dipstick. The level indicators of the cited patents remove most of the chance of getting oil, grease, or other fluids on clothing during checking of fluid levels.

While the devices of the cited patents work well and provide an accurate indication of actual fluid level in the reservoir, such devices have so far been found to be difficult to manufacture at a price which is attractive tot he automotive after-market.

SUMMARY OF THE INVENTION

According to the invention, a device for determining whether the liquid in a liquid reservoir is above a certain level includes a suction means operable by a user to create suction when it is desired to determine if the liquid in the reservoir is above the certain level and a conduit means which extends from the suction means into the reservoir. The conduit means has a passage therethrough which communicates with the suction created by the suction means and opens into the reservoir above the liquid in the reservoir when the liquid level is below the certain level. Indicator means are provided to indicate if the passage is opening into the reservoir above the level of the liquid.

In several embodiments of the invention, the passage opens into the reservoir at the certain level. When suction is created, if the liquid in the reservoir is above the certain level, i.e. above the opening of the passage into the reservoir, the liquid is drawn from the reservoir into the passage. If the liquid in the reservoir is below the certain level, it is not drawn into the passage, but only the air above the liquid is drawn into the passage. In such cases, the indicator means indicates whether or not liquid is being drawn into the passage. In one embodiment, the indicator means include an indicating reservoir to receive liquid drawn into the passage in a manner visible to the user so that the user actually sees the liquid drawn into the passage and indicating reservoir. When the suer sees liquid in the indicating reservoir, it indicates the fluid is above the certain level, otherwise, it would not be drawn into the indicating reservoir. In another embodiment, the operation of the suction means is monitored and serves as the indication of liquid being drawn into the passage. In such embodiment, the end of the passage in the liquid reservoir is configured so that liquid will enter the passage very slowly so operation of the suction means serves as the indicator of whether fluid is above the certain level. For example, the suction means may take the form of a piston and cylinder assembly wherein the piston is biased so that after the piston is moved from its rest position at one end of the cylinder to the other end of the cylinder against the bias, the bias will attempt to move the piston back again creating a vacuum or suction in the cylinder as the piston moves. If the passage opens into the air above the liquid in the reservoir, the air is easily drawn through the opening and the piston rapidly returns to its original rest position. If the more viscous liquid is drawn into the passage, the opening si such that it can only be drawn in very slowly so that the cylinder moves very slowly in response to the bias. This slow movement indicates liquid being drawn into the passage and that the fluid level is above the certain level.

In other embodiments of the invention, passage blocking means are provided to close the passage when the liquid is above the certain level so that the passage does not open into the reservoir. In one of these embodiments, a float valve is provided which seals the passage when the liquid level is above the certain level to block flow into the passage. If the piston and cylinder suction means is used, blockage of the passage stops movement of the piston in response to the bias. When the level of liquid drops below the certain level, the float valve opens and air is drawn into the passage to allow quick movement of the piston in the cylinder in response to the bias. This indicates the liquid is below the certain level.

The invention also contemplates the method for determining whether a liquid is above or below a certain level in a reservoir which includes the steps of inserting a conduit into the liquid reservoir, positioning the conduit in the reservoir so that when the liquid level in the reservoir is below the certain level, the conduit will open into the reservoir above the liquid in the reservoir, applying suction to the conduit and determining whether the conduit is opening into the reservoir above the level of the fluid

THE DRAWINGS

The best modes presently contemplated for carrying out the invention are shown in the accompanying drawings, in which:

FIG. 1 is a vertical section through one embodiment of the invention;

FIG. 2, a side elevation of the embodiment of FIG. 1, but with the piston in a different position;

FIG. 3, a vertical section similar to that of FIG. 1, but showing the piston in a different position and showing an alternate embodiment of the end of the conduit means of FIGS. 1 and 2;

FIG. 4, a side elevation similar to that of FIG. 2 but showing a float valve at the end of the conduit, and showing the cylinder as opaque rather than transparent as in FIG. 2;

FIG. 5, a fragmentary vertical section taken on the line 5—5 of FIG. 4;

FIG. 6, a transverse section taken on the line 6—6 of FIG. 5, and drawn to a larger scale;

FIG. 7, a fragmentary vertical section similar to that of FIG. 5, but showing the float valve in closed condition;

FIG. 8, a fragmentary vertical section of a portion of an internal combustion engine showing the oil reservoir and entrance tube thereinto through which an oil dipstick usually extends, but showing a device of the invention replacing the dipstick;

FIG. 9, a fragmentary vertical section through a portion of another embodiment of a piston and cylinder arrangement that can be used with the invention;

FIG. 10, a fragmentary vertical section through a portion of another embodiment of a piston and cylinder arrangement that can be used with the invention;

FIG. 11, a side elevation of a device of the invention alongside a normal dipstick which the device will replace showing how the device of the invention is calibrated;

FIG. 12, a fragmentary side elevation of the upper portion of another embodiment of the invention; and FIG. 13, a fragmentary side elevation of the upper portion of a further embodiment of the invention.

DETAILED DESCRIPTION OF THE ILLUSTRATED EMBODIMENT

FIGS. 1 and 2 illustrate an embodiment of the invention including a suction means in the form of a cylinder and piston assembly, illustrated generally as 10, and conduit means in the form of a semi-rigid plastic tube 11. A conduit end insert 12 provides a rounded end to the tube 11 and has an opening 13 therein which communicates with a central passage 14 in tube 1. Central passage 14 also communicates through opening 15 in cylinder end 16 with cylinder space 17. The cylinder of the cylinder and piston assembly 10 is formed of a length of rigid transparent tubing 18 with cylinder ends 16 and 19 threaded into the ends thereof. Cylinder end 16 is formed with a hub 20 for securing tubing 11 thereto. For convenience, hub 20 may be internally threaded so that tubing 11 may be threaded thereinto. However, other means of securing tubing 11 to hub 20 may be used.

Cylinder end 19 has opening 21 therein through which passes piston rod 22 which is formed with piston 23 at its end. Piston 23 slidably fits into tube 18. The space in the cylinder or tube 18 between the cylinder end 16 and piston 23 forms a suction chamber, shown and referred to as cylinder space 17. Cylinder end 19 acts as a stop for piston 23 when it reaches the end of the cylinder. A groove 23a extends around the piston to receive an O-ring 24 which forms an air tight seal between piston 23 and tube 18. A spring 25 urges piston 23 against cylinder end 19. Opening 21 in piston end 19 merely acts as a guide for piston rod 22 and does not form a seal therewith.

A passage 26 extends from communication with cylinder space 17 through piston 23 and piston rod 22, and has a larger diameter, internally threaded end 27 at the outer end of piston rod 22. A screw 30 with enlarged head 31 is threaded into passage end 27 and has a central bore 32 extending from its end where it communicates with piston rod bore 27 to meet with a transverse bore 33. An O-ring 34 is positioned around screw 30 adjacent head 31. Screw 30 may be rotated by means of head 31, advantageously provided with a knurled circumferential surface 35, so that transverse bore 33 opens to the atmosphere as shown in FIG. 1, thereby venting cylinder space 17 to the atmosphere, or so that transverse bore 33 is closed and sealed by O-ring 34 seated between the end of piston rod 22 and screw head 31 as shown in FIGS. 2 and 3.

For use, the device is positioned so that the suction means, i.e. the cylinder and piston assembly 10, is easily asccessible to a user and the conduit 11 extends into the reservoir containing the liquid whose level is to be measured. The device may be used to measure the level of oil in an automobile engine crankcase and in such case may replace the dipstick normally used for such purpose.

As shown in FIG. 8, a rigid tube 40 is sealingly secured in opening 41 in an engine crankcase 42. An oil pan 43 is secured to the bottom of the crankcase to hold the engine oil 44. Tube 40 generally extends upwardly with its end 45 located in an accessible portion of an automobile's engine compartment. Tube 40 and opening 41 into the crankcase are positioned so that a dipstick extending through tube 40 and opening 41 into the crankcase will extend into the oil 44 in the crankcase in a manner so that the level of oil 44 in the crankcase can be measured.

The device of the invention will replace the normal dipstick so, as shown in FIG. 8, cylinder and piston assembly 10 will rest on top of tube 40 with cylinder end 16 resting directly on tube top end 45. Hub 20 will extend into the upper end of tube 40 and may be sized to snugly fit into tube 40 to stabilize and hold the cylinder and piston assembly 10 in the end of tube 40. The conduit or tubing 11 extends through tube 40 into the crankcase of the engine, as shown. For the embodiments of the device shown in FIGS. 1, 2, and 3, tubing 11 extends into the reservoir a distance so that the open end of conduit end insert 12 is at a level 46 which represents the level of oil in the crankcase when one quart of oil should be added. This is the level that the device is to determine if the oil is above or below. If the oil level in the crankcase is above the level 46, such as at the level indicated at 47, the oil is above the end of conduit end insert 12, as shown.

In operation of the device of FIGS. 1 and 2, when the device is in place as shown in FIG. 8 and it is desired to measure the oil level, screw 30 is rotated so that transverse passage 33 is sealed, as shown in FIGS. 2 and 3, thus closing passage 26 so that cylinder space 17 does not communicate with the atmosphere. Piston rod 22 is depressed, usually by the user pushing down on screw head 31, causing piston 23 to move in tube 18 toward end 16 and away form end 19, and causing spring 25 to compress. Piston 23 will move in tube 18 toward end 16 until spring 25 is fully compressed as shown in FIG. 3 and piston 23 is near end 16 of the cylinder. Annular groove 48 in piston 23 and annular groove 49 in cylinder end 16 center spring 25 and allow most, if not all, of its compressed length to be accommodated therein so that when depressed, piston 23 is preferably substantially adjacent cylinder end 16. During movement of piston 23, air in cylinder space 17 is forced through passage 14 in conduit 11 and out through opening 13 in conduit end insert 12 into the crankcase.

When the force of the user depressing piston 23 is released, spring 25 causes piston 23 to move back toward end 19 of the cylinder. Because O-ring 24 forms an air seal, the movement of piston 23 away from cylinder end 16, which causes cylinder space 17 to increase in volume, causes a partial vacuum or suction to be formed in cylinder space 17. This draws whatever is at the opening of conduit end insert 12 into passage 14 and up into cylinder space 17. If conduit end insert 12 is in the oil as shown in FIG. 8, meaning that the oil level is above that indicating that an additional quart is needed, as piston 23 returns to its position as shown in FIG. 1, oil is drawn into passage 14 in conduit 11 and into cylinder space 17. In this case, the cylinder also forms an indicator chamber or reservoir to collect the oil drawn from the crankcase by the suction means. FIG. 2 shows piston 23 during its travel back toward end 19 of the cylinder and shows oil 44 being drawn into cylinder space 17. Tube 18 is transparent so that the oil drawn into the cylinder can be observed. When oil is drawn into the cylinder, the device indicates that the oil is above the preset level and no oil needs to be added. If the oil is below the conduit end insert 12, as would be the case if the oil was at level 46 or below in FIG. 8, when piston 23 is released, only air is drawn up into cylinder space 17. The lack of oil drawn into cylinder space 17 indicates that the oil is below the safe level 46, FIG. 8, and that an additional quart of oil should be added. Because some oil may remain in passage 14 or the bottom of cylinder space 17 when the piston 23 is depressed, an indicator line 50 may be provided on tube 18 indicating that the oil must be above that line when piston 23 returns to its rest position against cylinder end 19 after being substantially fully depressed to indicate a safe level of oil in the engine.

After piston 23 returns to its position against cylinder end 19 as shown in FIG. 1 and the oil level has been measured, screw 30 is loosened to open transverse passage 33 to the atmosphere to vent cylinder space 17 and allow the oil therein to drain back into the crankcase of the engine.

While venting of the cylinder space 17 is presently preferred so that oil does not remain in the cylinder space 17 between measurements, such venting is not necessary and the device will work satisfactorily if no venting is provided. In such instance, oil will remain in cylinder space 17 between measurements. However, when the piston is depressed to take a measurement, the oil in cylinder space 17 is forced back into the crankcase and upon release of piston 23, either oil or air is drawn back into the cylinder space 17 to indicate whether oil is above or below the preset level being measured. Thus, rather than the piston and piston rod configuration as shown in FIGS. 1 and 2, a piston 51 and piston rod 52 without venting passage 26, as shown in FIG. 9, may be used. This eliminates the need for the user to open or close the venting passage by rotation of screw head 31 and eliminates the need for screw 30.

An alternate arrangement, where venting is still desired, is shown in FIG. 10, wherein a venting passage 26 extends through a piston 23' to the top of a piston rod 22', and screw 30 is not provided. When cylinder space 17 is to be sealed from the atmosphere, the user places his thumb or other finger over the end of passage 26' at the top of piston rod 22'. This eliminates screw 30 and the need for the user to rotate screw head 31 to open and close the venting passage. However, it requires the user to maintain a thumb or other finger tip over and blocking passage 26' during measurement.

Rather than drawing the liquid to be measured into cylinder space 17 as an indication of whether or not the liquid is above or below the present level to be measured, when the liquid is substantially more viscous than air, such as oil is, the opening in conduit end 12 may be made very small, such as opening 55, FIG. 3. In FIG. 3, opening 55, although shown smaller than opening 13 in FIGS. 1 and 2, is still exaggerated for ease of illustration. Opening 55 will be of a size so that air can still easily and rapidly flow therethrough, but the flow of liquid to be measured will be substantially restricted. Thus, when piston 23 is depressed as shown in FIG. 3 and then released, if the end of conduit end 12 is in the liquid to be measured, opening 55 restricts passage of the liquid into conduit 11 so that piston 23 is able to move only very slowly under the bias of spring 25 back toward the other end of the cylinder. However, if the liquid is below the opening 55, air is drawn through opening 55 at a rapid rate and piston 23 returns to the other end of he cylinder very rapidly. Thus, with the embodiment of FIG. 3, piston 23 is depressed to initiate a check of liquid level. If it rapidly moves back to its undepressed position, such rapid movement indicates that the liquid level is below the preset level and when used with an engine to measure oil as shown in FIG. 8, that a quart of oil should be added. If, after depressing the piston, it moves only very slowly back toward the other end of the cylinder, such slow movement indicates that the liquid is above the preset or safe level. The movement of piston 23 in the cylinder is observable by the user by observing the movement of the end of piston rod 22 which extends from the end 19 of the cylinder.

With the embodiment of FIG. 3, tube 18 does not have to be transparent because it is not necessary to see if oil has been drawn into the cylinder, and, where a vent is provided, the vent will usually be opened before the oil has been drawn into the cylinder since it will take some time for oil to be drawn up conduit 11 into the cylinder. However, it has been found that if oil is drawn into the cylinder, it can be forced relatively quickly back into the crankcase through hole 55 under the depressing pressure of a user. Such depressing pressure is usually much greater than the bias exerted by spring 25 on the piston.

FIGS. 4–7 show a further embodiment of the device of the invention. With the embodiment of FIGS. 4–7, a float valve is provided at the end of conduit 11. The liquid to be measured in the reservoir operates the float valve so that when the liquid is above the preset level to be measured, the float valve is closed, but when the liquid drops below the level to be measured, the float valve is open thereby opening the passage 14 in conduit 11 to the reservoir above the level of the liquid.

As shown in FIS. 4–7, a conduit end insert 60 is secured in the end of conduit 11 in a manner similar to conduit end insert 12 of FIGS. 1–3. A hollow float 61 made up of flat halves 62 and 63 has a shaft 64 extending from the top thereof and passing through opening 65 in conduit end insert 60. A pin 66 extends through shaft 64 to keep it from sliding out of opening 65. Shaft 64 has grooves 67 in opposite sides thereof to allow passage of air into passage 14 of conduit 11. An O-ring 68 is provided where shaft 64 meets float 61.

In operation, when the liquid level in the reservoir is such that float 61 moves upwardly with respect to conduit end 60 as shown in FIG. 7, O-ring 68 seals opening 65. When the piston is depressed, air in cylinder space 17 will force the float downwardly to the extent necessary so the air will escape into the reservoir, but when spring 25 tries to move piston 23 back toward the other end of the cylinder, it will not move because opening 65 is sealed. Some initial slight movement of the piston may take place as the vacuum or suction is created in passage 14 and cylinder space 17. The lack of movement of piston 23 indicates a satisfactory liquid level.

When the level of the liquid in the reservoir drops to allow the float to move downwardly sufficiently so that opening 65 is no longer sealed by O-ring 68, FIGS. 5 and 6, when piston 23 is depressed, it will rapidly return to its undepressed position. Such rapid return indicates a low liquid level. A line 69, FIG. 4, may be provided on flat 61 to indicate where the level of the liquid will be when the float is immersed and freely floating in the liquid, indicated as 70.

While devices of the invention may be specifically sized for specific engines or other uses, since most engines have slightly different length dipsticks, such special sizing would require many different sizes of the device to be stocked by a dealer. With the invention as described, a single device may be provided that may easily be sized by the user for a particular use. Thus, a single unit may be provided with conduit 11 as long as the longest dipstick which the device is to be used to replace. Conduit 11 will generally be made of a semi-rigid plastic material. It has to be rigid enough so that it will extend straight into the reservoir form the guide tube and will not curl, but has to be flexible enough so that it can bend with the guide tube leading into the reservoir. Further, it has to be heat resistant when used on an internal combustion engine so that it will not melt or burn at engine temperatures. When used to replace a dipstick, the device is laid out on a flat surface alongside the dipstick 71, FIG. 11, it is to replace. Since it is preferred to use a conduit tip end insert 12, FIGS. 1 and 2, at the end of the conduit to provide a rounded conduit end for ease of insertion of the conduit into an engine as a replacement for the dipstick and to provide a controlled opening in the end of the conduit for the embodiment of FIG. 3, the piston and cylinder assembly 10, FIG. 11, will have a mark 72 thereon a distance 73 upwardly from the bottom end of the cylinder which rests on the top of the dipstick guidetube the height 74 of the conduit end insert 12 which extends from the end of the conduit when mounted in the conduit. This mark 72 is aligned with the surface 75 of dipstick 71 which rests on the top of the dipstick guide tube. Conduit 11 is then cut so that its end after cutting is aligned with the add one quart line 76 on the dipstick. After cutting the conduit 11 to length, conduit end insert 12 is secured into the end of the conduit and the conduit is ready for use. A slot may be provided in the end of the conduit end insert 12 to receive a screw driver blade to facilitate installation of the end, or end insert 12 may be configured so it can be merely pushed into the end of the conduit. After installation of the conduit end insert 12, the conduit will be of a proper length so that the opening in end insert 12 is at the add one quart level in the crankcase when the device is installed as a replacement for the dipstick. If a float device is mounted on the end of the conduit as shown in FIGS 4-7, line 72 on cylinder and piston assembly 10 will be placed to compensate for the additional length provided by the float device, i.e. the distance from the float line 69 of the float to the end of conduit 11 when the float assembly is installed and the float is in its upper, closed condition. This line is then lined up with the top 75 of the dipstick and conduit 11 cut off in line with the add one quart line 76.

To further facilitate a wide range of uses for the device, hub 20 extending from end 16 of the cylinder and piston assembly 10 may be made small enough and with springs 80 extending therefrom a sufficient distance so that it can be inserted into a wide range of dipstick guide tubes and be held in place in the top of the guide tube by springs 80. Thus, the same device could be used for either measuring engine oil level as has been described or for measuring transmission fluid level in an automatic transmission which usually has a larger diameter guide tube than the guide tube used for oil level measurements.

While the suction means has been shown and described as a cylinder and piston assembly with the piston biased toward one end of the cylinder, various other suction means could be used with the invention. For example, a squeeze bulb 85, FIG. 13, could be mounted at the top of an indicator chamber or reservoir 86 to provide a device similar to that shown in FIGS. 1 and 2, or the squeeze bulb could be mounted in communication with conduit 11 without the indicator reservoir to be used as explained for the embodiments shown in FIGS. 3 and 4-7. The cylinder and piston assembly is currently preferred because it is reliable and can create a large amount of suction. Further, rather than biasing the piston to one side of the cylinder so that the vacuum or suction is created by the biasing means, the piston, or other suction means used, could be manually operated so that a user would grasp the piston rod, such as by means of screw head 31 or other handle means, and pull the piston toward the end of the cylinder. The resistance to such pull with the embodiments of FIGS. 3-7 indicating whether or not the liquid level is above or below the certain level being measured, or the presence or absence of liquid in the cylinder or indicator reservoir after travel of the piston in the cylinder giving the indication with the embodiments of FIGS. 1 and 2.

The invention has been described with specific reference to use for measuring liquid levels associated with an automobile, such as engine oil level and transmission fluid level, and for determining whether the fluid is above or below a critical level where additional liquid should be added. However, the invention can be used in any situation where it is desired to determine if a liquid level is above or below a critical level. In some instances, the critical situation may be that the liquid has risen above the certain level rather than fallen below the certain level as described for the engine liquids. Further, the materials used in the construction of the device will vary with intended use. The embodiment of FIGS. 1 and 2 with an indicator reservoir require a transparent cylinder or transparent window in the cylinder so liquid in the cylinder can be observed. The remaining embodiments do not required transparency so a wide range of materials may be used. When used with an automobile engine, the materials must be heat resistant to withstand the heat of the automobile engine compartment.

The invention also contemplates the method for determining whether a liquid is above or below a certain level in a reservoir which includes the steps of inserting a conduit into the liquid reservoir, positioning the conduit in the reservoir so that when the liquid level in the reservoir is below the certain level, the conduit will open into the reservoir above the liquid in the reservoir, applying suction to the conduit and determining whether the conduit is opening into the reservoir above the level of the fluid.

Whereas this invention is here illustrated and described with specific reference to an embodiment thereof presently contemplated as the best mode of carrying out such invention in actual practice, it si to be understood that various changes may be made in adapting the invention to different embodiments without departing from the broader inventive concepts disclosed herein and comprehended by the claims that follow.

I claim:

1. Apparatus for determining whether a liquid in a liquid reservoir is above a certain level in the reservoir, comprising a cylinder; a piston slideably and sealingly mounted in the cylinder and forming a suction chamber in the cylinder between the piston and one end of the cylinder said suction chamber being configured so that presence of liquid therein can be visually detected; bias means between the piston and the one end of the cylinder to bias the piston away from the one end of the cylinder; means for positioning the piston in the cylinder against the bias means toward the one end of the cylinder so that when the piston is released, it moves under the urging of the bias means to create a suction in the suction chamber; conduit means extending from the one end of the cylinder and adapted to be positioned in the reservoir, said conduit means having a passage therethrough communicating with the suction chamber in the cylinder and communicating with the reservoir through an opening at the end of the passage located in the reservoir at the certain level so that if the liquid in the reservoir is above the certain level, it is above the opening of the passage into the reservoir, and if the liquid in the reservoir is below the certain level, it is below the opening of the passage into the reservoir; whereby, when suction is created in the suction chamber, if the liquid in the reservoir is above the certain level, the liquid is drawn through the passage into the suction chamber and its presence therein is visually detectable, but, if the level of the liquid is below the certain level, liquid is not drawn into the passage, presence of an amount of the liquid in the chamber after operation of the piston means indicating the liquid level in the reservoir is above the certain level while absence of an amount of the liquid in the chamber after operation of the piston means indicating the liquid level in the reservoir is below the certain level; and means for allowing communication between the suction chamber and the atmosphere after liquid has been drawn into the suction chamber so the liquid drawn into the suction chamber can flow through the passage back into the reservoir.

2. Apparatus for determining whether a liquid in a liquid reservoir is above a certain level according to claim 1, wherein the bias means is a spring.

3. Apparatus for determining whether a liquid in a liquid reservoir is above a certain level according to claim 2, wherein the means for positioning the piston is a piston rod secured to the piston and extending from the cylinder and adapted to be moved by a user of the device to position the piston against the bias means.

4. Apparatus for determining whether a liquid in a liquid reservoir is above a certain level according to claim 3, wherein the means for allowing communication between the suction chamber and the atmosphere includes valve means for controlling such communication.

5. Apparatus for determining whether a liquid in a liquid reservoir is above a certain level according to claim 3, wherein the means for allowing communication between the suction chamber and the atmosphere is a passage extending between the suction chamber and the atmosphere adapted to be blocked by a user during operation of the suction means.

6. Apparatus for determining whether a liquid in a liquid reservoir is above a certain level according to claim 5, wherein the passage extending between the suction chamber and the atmosphere is adapted to be blocked by a user's finger placed over the end of the passage.

7. Apparatus for determing whether a liquid in a liquid reservoir is above a certain level according to claim 6, wherein the passage extending between the suction chamber and the atmosphere is adapted to be blocked by a user's finger placed over the end of the passage.

8. Apparatus for determining whether a liquid in a liquid reservoir is above a certain level according to claim 1, wherein the cylinder walls are transparent.

9. Apparatus for determining whether a liquid in a liquid reservoir is above a certain level according to claim 1 wherein the indicator means includes liquid flow restriction means where the passage opens into the reservoir to restrict flow of liquid into the passage if the liquid is above the opening but allow relatively unrestricted flow of air into the passage if the liquid is below the opening.

10. Apparatus for determining whether a liquid in a liquid reservoir is above a certain level according to claim 9, wherein the movement of the piston in the cylinder away from the one end is substantially slowed by the restricted flow of fluid into the passage and such slowed movement of the piston is observable by the user of the device and serves to indicate that liquid in the reservoir is above the certain level prior to the liquid being drawn into the reservoir.

11. Apparatus for determining whether a liquid in a liquid reservoir is above a certain level according to claim 10, wherein the means for allowing communication between the suction chamber and the atmosphere includes valve means for controlling such communication.

12. Apparatus for determining whether a liquid in a liquid reservoir is above a certain level according to claim 11, wherein the means for allowing communication between the suction chamber and the atmosphere is a passage extending between the suction chamber and the atmosphere adapted to be blocked by a user during operation of the suction means.

13. Apparatus for determining whether a liquid in a liquid reservoir is above a certain level in the reservoir, comprising indicator chamber means configured so that presence of liquid in said indicator chamber means can be visually detected; suction means associated with the indicator chamber means and operable by a user to create suction in the indicator chamber means when the user desires to determine if the liquid in the reservoir is above the certain level; means for selectively allowing communication between the indicator chamber and the atmosphere; and conduit means extending from the indicator chamber means and adapted to be positioned in the reservoir, said conduit means having a passage therethrough communicating with the indicator chamber and communicating with the reservoir through an opening in the passage located in the reservoir at the certain level so that if the liquid in the reservoir is above the certain level, it is above the opening of the passage into the reservoir and if the liquid in the reservoir is below the certain level, it is below the opening of the passage into the reservoir; whereby, when suction is created int he indicator chamber, if the liquid in the reservoir is above the certain level, the liquid is drawn through the passage into the indicator chamber, but, if the level of the liquid is below the certain level, liquid is not drawn into the passage, presence of an amount of liquid in the indicator chamber after operation of the suction means indicating the liquid level in the reservoir is above the certain level, while absence of an amount of liquid in the indicator chamber after operation of the suction means indicating the liquid level in the reservoir is below the certain level.

14. Apparatus for determining whether a liquid in a liquid reservoir is above a certain level according to claim 13, wherein the indicator chamber means includes a cylinder, wherein the conduit means extends from one end of the cylinder; and wherein the suction means associated with the indicator chamber includes a piston slideably and sealingly mounted in the cylinder, means for positioning the piston within the cylinder near the one end of the cylinder, and means for moving the piston in the cylinder away from the one end of the cylinder to crete suction in the indicator chamber and the passage.

15. Apparatus for determining whether a liquid in a liquid reservoir is above a certain level according to claim 14, wherein the means for moving the piston in the cylinder is bias means.

16. Apparatus for determining whether a liquid in a liquid reservoir is above a certain level according to claim 15, wherein the bias means is a spring.

17. Apparatus for determining whether a liquid in a liquid reservoir is above a certain level according to claim 15, wherein the means for positioning the piston is a piston rod secured to the piston and extending from the cylinder and adapted to be moved by a user of the device to position the piston against the bias means.

18. Apparatus for determining whether a liquid in a liquid reservoir is above a certain level according to claim 17, wherein the means for allowing communication between the suction chamber and the atmosphere includes valve means for controlling such communication.

19. Apparatus for determining whether a liquid in a liquid reservoir is above a certain level according to claim 17, wherein the means for allowing communication between the suction chamber and the atmosphere is a passage extending between the suction chamber and the atmosphere adapted to be blocked by a user during operation of the suction means.

20. Apparatus for determining whether a liquid in a liquid reservoir is above a certain level according to claim 13, wherein the suction means is a squeeze bulb.

* * * * *